United States Patent [19]
Tilsen

[11] 4,145,857
[45] Mar. 27, 1979

[54] BASE FOR MOUNTING ELECTRICAL EQUIPMENT

[75] Inventor: Benjamin L. Tilsen, Northfield, Minn.

[73] Assignee: Concast, Inc., Rosemount, Minn.

[21] Appl. No.: 846,430

[22] Filed: Oct. 28, 1977

[51] Int. Cl.² ............................................. H02G 9/10
[52] U.S. Cl. ...................................... 52/285; 52/293; 174/37; 174/38
[58] Field of Search .............. 52/293, 284, 283, 169.1, 52/274, 603, 142, 143, 286, 270, 20, 285; 174/37, 38; 217/65

[56] References Cited

U.S. PATENT DOCUMENTS

| | | | |
|---|---|---|---|
| 860,015 | 7/1907 | Condie | 52/285 |
| 1,506,267 | 8/1924 | Swisher | 52/270 |
| 1,860,266 | 5/1932 | Potts | 52/142 |
| 1,964,131 | 6/1934 | Nelson | 52/602 |
| 2,350,018 | 5/1944 | Dean | 52/20 |
| 2,742,776 | 4/1956 | Peirce | 52/285 |
| 3,182,847 | 5/1965 | Fuller | 217/65 |
| 3,415,406 | 12/1968 | Habgood | 217/65 |
| 3,485,405 | 12/1969 | Dement | 52/284 |

FOREIGN PATENT DOCUMENTS

| | | | |
|---|---|---|---|
| 540056 | 12/1931 | Fed. Rep. of Germany | 217/65 |
| 537339 | 6/1941 | United Kingdom | 52/602 |

*Primary Examiner*—John E. Murtagh
*Attorney, Agent, or Firm*—Burd, Braddock & Bartz

[57] ABSTRACT

A sectionalized structure of preformed wall panels especially adapted for use as base for burial in the earth for mounting above-ground electrical equipment such as sectionalizing cabinets, transformers, electrical switch gear boxes, and similar equipment connected to underground utility cables. The base is preferably formed from precast concrete modular form panels which are adapted for assembly at the installation site. The wall members terminate in beveled vertical edges which abut to form mitered corners. Clamping fastening means engaging the mitered corners secure the base wall panels in rigid geometrical configuration.

9 Claims, 9 Drawing Figures

U.S. Patent  Mar. 27, 1979  Sheet 1 of 2  4,145,857
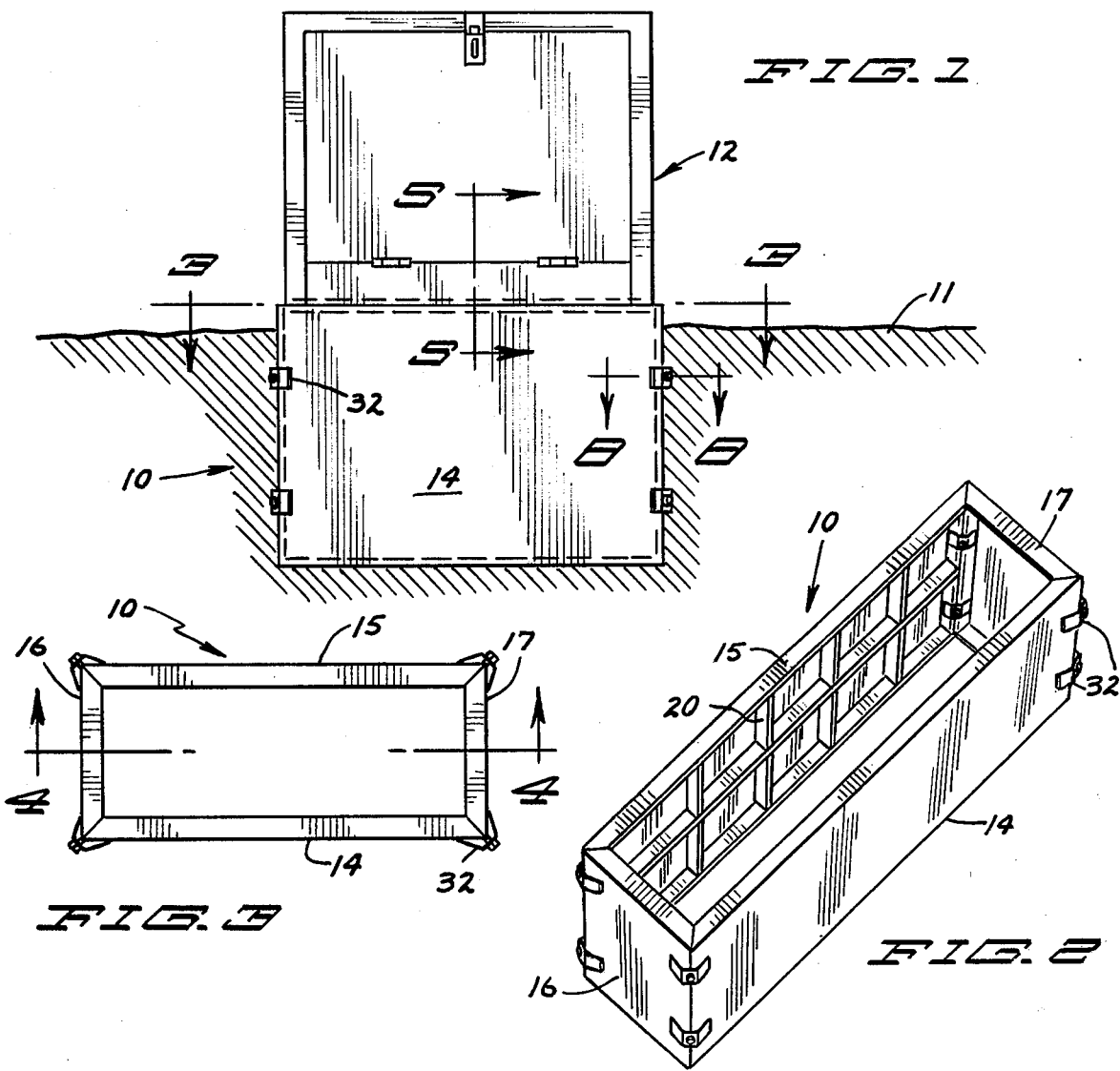
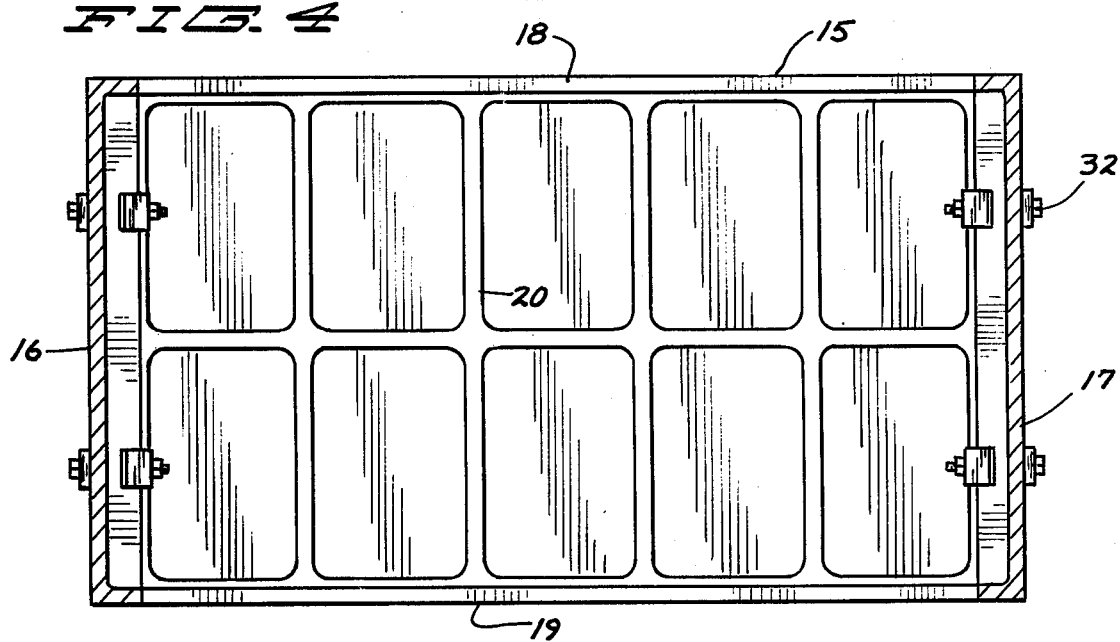

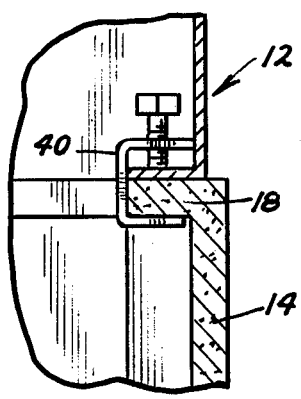
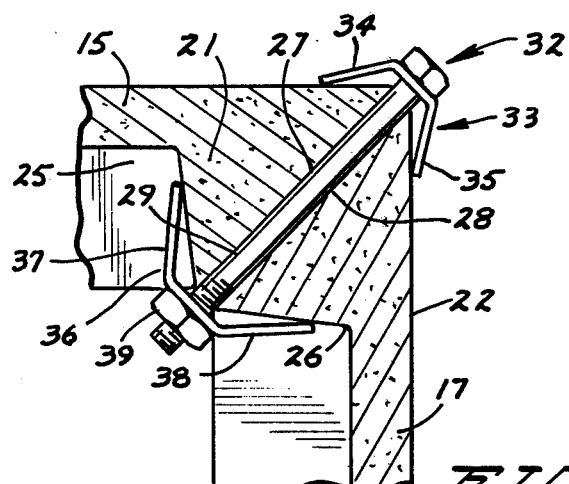
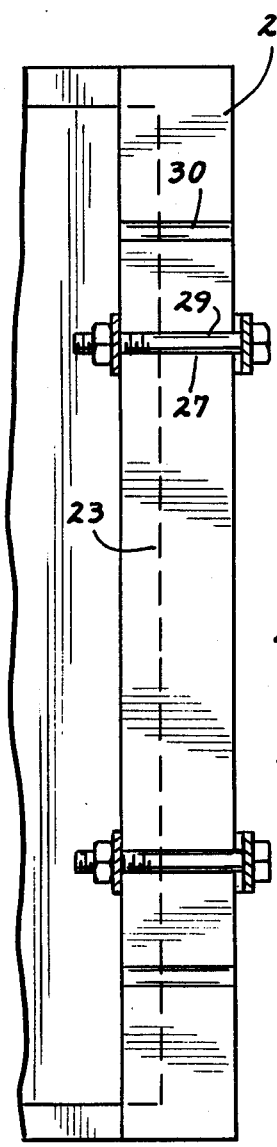
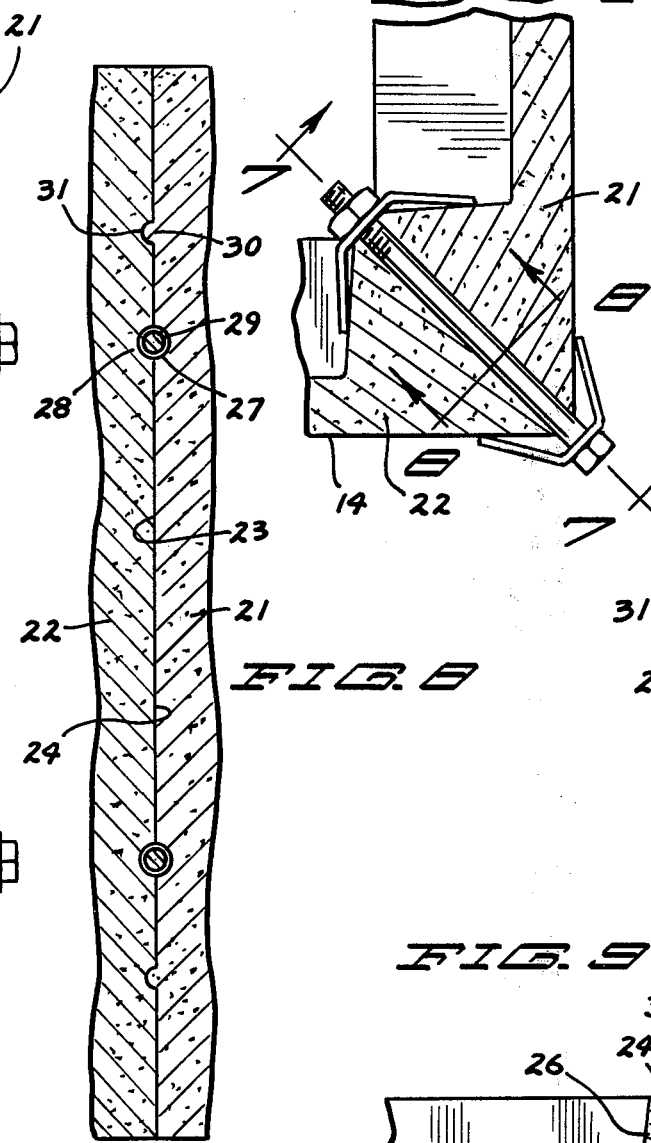
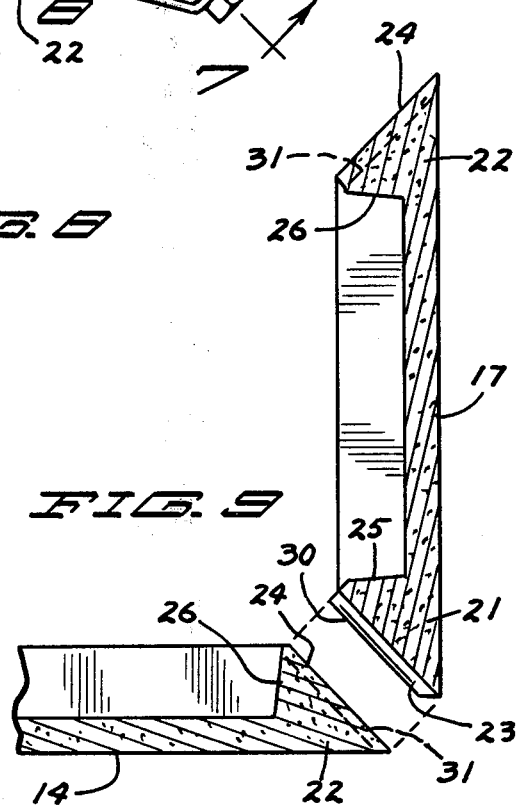

BASE FOR MOUNTING ELECTRICAL EQUIPMENT

FIELD OF THE INVENTION

This invention is directed to a closed sectionalized structure open at the top and bottom and comprised of a plurality of modular preformed vertical wall members clamped together in miter-butt joints along their abutting end edges. Such structures may be used, for example, as underground bases for mounting electrical equipment. More specifically, the invention is directed to a base adapted for burial in the earth for mounting aboveground electrical equipment such as sectionalizing cabinets, transformers, switch gear boxes, and the like, which in turn are connected to underground cable.

SUMMARY OF THE INVENTION

The structure of the present invention is a sectionalized box open on the top and bottom and comprising a plurality of spaced apart vertical walls in end-to-end miter-butt engagement. Each of the wall members is precast in concrete or other suitable material. There is a thickened vertical lip adjacent each end of each wall panel. The outer face of that lip extends inwardly at an angle dependent upon the number of wall panels and the geometric configuration of the structure to form a miter-butt joint with the next adjacent wall panel. One or more horizontal grooves are formed in the outer faces of those lips at both ends of the wall member, the groove of one wall member being disposed oppositely relative to the groove of the next adjacent abutting wall member to define a passage for receiving a fastening element.

At each corner, clamping assembly means secure adjacent wall members together. The clamping means comprise a first angular bracket disposed around the outer corner formed by adjacent wall members and engaging those outer corner surfaces, and a second angular bracket disposed about the inner corner formed by the inner faces of the adjacent wall members and engaging those inner corner faces. The angular brackets are secured together by a fastening element, such as a carriage bolt, extending through the brackets and passage and having a nut for securing the brackets together. Preferably the outer face of the lip at one end of the wall member is provided with one or more further horizontal grooves and the outer face of the lip at the other end of the wall member is provided with one or more horizontal ribs so positioned that the rib of one wall member is engageable in the further groove of the next adjacent abutting wall member.

BRIEF DESCRIPTION OF THE DRAWINGS

The invention is illustrated in the accompanying drawings in which corresponding parts are identified by the same numerals and in which:

FIG. 1 is an elevation, showing a base according to the present invention buried in the ground and supporting a cabinet housing electrical equipment;

FIG. 2 is a perspective view showing a typical assembled base;

FIG. 3 is a section on the line 3—3 of FIG. 1 showing the base in top plan form;

FIG. 4 is a section on enlarged scale on the line 4—4 of FIG. 3 and in the direction of the arrows;

FIG. 5 is a fragmentary section on an enlarged scale on the line 5—5 of FIG. 1 and in the direction of the arrows showing means for attachment of a housing to the base;

FIG. 6 is a fragmentary section on an enlarged scale on the line 6—6 of FIG. 1 and in the direction of the arrows showing the clamping means in greater detail;

FIG. 7 is an elevation in section on the line 7—7 of FIG. 6 and in the direction of the arrows;

FIG. 8 is an elevation in section on the line 8—8 of FIG. 6 and in the direction of the arrows; and FIG. 9 is a fragmentary exploded plan view in section of two adjacent base wall members showing mating ribs and grooves.

DETAILED DESCRIPTION OF THE PREFERRED EMBODIMENT

Referring to the drawings, there is shown in FIG. 1 a sectionalized supporting base indicated generally at 10 buried in the earth 11 except for its top edge on which a cabinet 12 is mounted Cabinet 12, which per se forms no part of the present invention, is constructed generally of metal and provided with a hinged door for access. It contains electrical equipment of various types such as switch gear boxes, transformers, sectionalizing cabinets, or the like, which equipment is connected to electrical cable buried in the earth and having ends terminating within the equipment mounted on the base. Because cabinets 12 are provided in varying sizes to house varying equipment, the wall members of bases 10 are made in corresponding varying sizes.

As seen, for example, in FIGS. 2 and 3, each base is in the form of a rectangular box open at the top and bottom and comprised of a pair of parallel spaced apart vertical side walls 14 and 15 and a pair of parallel spaced apart vertical end walls 16 and 17 in miter-butt engagement. The wall members are formed of precast concrete. Preferably the wall members are formed of concrete capable of long life submerged in the earth. Desirably the concrete is reinforced with chopped strands of glass fiber. However, other suitable materials such as reinforced plastic or the like may be used. Metallic reinforcing rods may desirably be incorporated for strength, depending upon the size of the wall member.

Each wall member is desirably relatively thin-walled and preferably has inwardly extending horizontal flanges 18 and 19 along the top and bottom edges, respectively. Where necessary or desirable because of the size of the wall member, inwardly extending vertical and/or horizontal reinforcing ribs 20 are provided. As best seen in FIGS. 6 and 9, the opposite ends of each wall member are provided with thickened vertical lip portions 21 and 22, respectively. The outer faces 23 and 24, respectively, of the thickened lip portions 21 and 22 of the wall members extend inwardly at an angle of approximately 45° relative to the plane of the wall members to permit the formation of a miter-butt joint. The inner faces 25 and 26 of the thickened lip portions 21 and 22, respectively, of the wall members extend generally perpendicular to the planes of said walls to facilitate assembly, as pointed out in greater detail hereinafter.

Each outer lip face 23 is provided with one or more horizontal grooves 27 and each lip face 24 is provided with one or more horizontal grooves 28 which are disposed oppositely relative to one another such that when the lip faces of adjacent wall members are placed in miter joint abutment, grooves 27 and 28 together define a passage for receiving a fastening element, such as carriage bolt 29. To facilitate positioning of the wall members in the assembly of a base, each outer lip face 23 is desirably provided with one or more horizontal ribs 30. Each outer lip face 24 is provided with a corresponding horizontal groove 31 so positioned as to be engageable with the rib of the next adjacent abutting wall member when assembled in a miter-butt joint. Ribs 30 and grooves 31 function both in maintaining vertical alignment of the structure and in assisting in transferring shear forces.

As best seen in FIG. 6, the assembled base is held together by clamping assembly means indicated generally at 32. In addition to carriage bolt 29, the clamping assembly includes a first angular bracket 33 having a pair of angularly spaced apart arms 34 and 35. Bracket 33 is disposed around the outer corner formed by adjacent wall surfaces and the ends of arms 34 and 35 engage those surfaces. The clamping assembly means also includes a second inner annular bracket 36 having a pair of angularly extending arms 37 and 38. Bracket 36 is disposed about the inner corner formed by the inner faces 25 and 26 of the end lips 21 and 22 of adjacent wall members. The ends of bracket arms 37 and 38 engage faces 25 and 26, respectively. Each bracket has a central aperture located between the angularly extending arms. Carriage bolt 29 extends through the aperture of outer bracket 33, through the passage formed by grooves 27 and 28, through the central aperture of bracket 36, and is engaged by nut 39.

The arms of brackets 33 and 36 are desirably disposed at acute angles less than the angle of the corner to be engaged by the bracket so that the corner surfaces are resiliently engaged by the ends of the arms and nut 39 can be tightened on bolt 29 without fear of damaging the wall members. For long life while buried in the ground, brackets 33 and 36 are desirably formed from rigid synthetic resinous plastic material, such as fiber glass reinforced polyester. Similarly, carriage bolt and nut 29 and 39 are desirably formed from zinc coated steel for additional protection or from stainless steel.

The base of the present invention is generally transported to the site of use unassembled. A hole of appropriate size, slightly larger than the assembled base, is dug in the ground to the appropriate depth. The bottom surface of the hole is leveled, as with sand or the like. The base members are assembled on site and lowered into the ground. The earth surrounding the base is restored. A cabinet 12 of appropriate configuration is mounted on the exposed top surface of the base. Cabinet 12 is ordinarily provided with an inwardly extending horizontal bottom flange by which the cabinet may be rigidly secured to the flange 18 of the base wall members by means of a simple C-clamp 40.

Although the structure of the present invention is described specifically in its preferred form as a base for mounting housings for electrical equipment, it may obviously be used for other purposes wherever an open-ended enclosure of geometric configuration is needed. For example, the structures may be used for lining the walls of excavations, they may be used as grave liners, and the like. Although open-ended as formed, they may obviously be installed on slabs and/or covers may be laid over the open tops, depending upon the particular use.

The preferred structure is described and illustrated as rectangular in form. However, so long as the outer lip faces are at the appropriate angle to form a miter-butt joint, the wall panels may be assembled into structures of different geometrical configurations. For a symmetrical geometrical configuration, the proper angle is determined by dividing the sum of all of the exterior angles of the particular geometrical configuration by the number of panel ends. In the case of a rectangle, the sum of whose angles equal 360°, the number of wall segments is four, each having two ends. 360° divided by 8 equals 45°, the required angle for a miter-butt joint in a rectangular structure. In the case of a triangle, the sum of the angles is 180°, which divided by 6 (ends of three wall panels) equals 30°, the proper angle to form a miter-butt joint. In the case of a hexagon, the sum of the angles is 720°, which divided by 12 (six sides having twelve ends) equals 60°, the proper angle for a miter-butt joint.

The preferred structure has a flat outer wall structure with inwardly extending flanges, ribs and lips. For some purposes it may be desirable for the inner surface of the assembled structure to be flat with the flanges, ribs and end lips extending outwardly. Such structure is encompassed within the present invention. The inner clamp in this instance engages the inside corner surfaces and the outer clamp engages the outside corner surfaces.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A sectionalized box structure open on the top and bottom and comprising:
   (A) a plurality of spaced apart vertical wall members in end-to-end miter-butt engagement, each of said wall members:
   (1) having a vertical lip adjacent each end,
      (a) the outer face of said lip extending inwardly at an acute angle less than 90° appropriate to form a miter-butt joint for the particular geometrical configuration of the structure,
   (B) at least one horizontal groove in the outer faces of said lips at both ends of the wall member,
      (1) said groove of one wall member being disposed oppositely relative to the groove of the next adjacent abutting wall member to define a passage for receiving a fastening element,
   (C) at least one further horizontal groove in the outer face of said end lip at one end of each of said wall members, and at least one horizontal rib on the outer face of said end lip at the other end of each of said wall members, said further groove and rib being so disposed that the further groove of one wall member is engageable by the rib of the next adjacent abutting wall member, and
   (D) clamping assembly means securing adjacent abutting wall members together, said clamping members comprising:
   (1) a first angular bracket disposed around the outer corner formed by adjacent wall members and engaging said members,
   (2) a second angular bracket disposed about the inner corner formed by the wall members and engaging inner surfaces of said members, and
   (3) a fastening element extending through said brackets and passage securing the brackets together.

2. A structure according to claim 1 wherein said wall members each include:

(A) at least a pair of spaced apart horizontal grooves defining a fastening element passage in said lip at both ends of the wall member, (B) at least a pair of spaced apart further horizontal grooves in the outer face of said lip at one end of the wall member, and (C) at least a pair of spaced apart horizontal ribs on said lip at the opposite end of the wall member.

3. A structure according to claim 1 wherein said wall members are formed of precast concrete.

4. A structure according to claim 1 wherein:
(A) said wall members are relatively thin-walled,
(B) said wall members have horizontal flanges along the top and bottom edges, and
(C) said vertical end lips are thickened.

5. A rectangular structure according to claim 1 wherein said structure comprises:
(A) a pair of parallel spaced apart vertical side walls and a pair of parallel spaced apart vertical end walls in miter-butt engagement therewith,
(B) inwardly extending horizontal flanges along the top and bottom edges of said wall members,
(C) an inwardly extending thickened vertical lip adjacent each end of said wall members,
  (1) the outer face of said lip extending inwardly at an angle of approximately 45° relative to the plane of said wall, and
  (2) the inner face of said lip extending generally perpendicular to the plane of said wall.

6. A structure according to claim 1 wherein said brackets are formed from rigid synthetic resinous plastic material.

7. A structure according to claim 6 further characterized in that said brackets are formed from fiber glass reinforced polyester.

8. An underground rectangular base adapted for burial in the earth for mounting housings for electrical equipment, said base comprising:
(A) a pair of parallel spaced apart vertical side walls and a pair of parallel spaced apart vertical end walls in miter-butt engagement therewith, each of said wall members:
  (1) being formed of precast concrete,
  (2) being relatively thin-walled,
  (3) having inwardly extending horizontal flanges along the top and bottom edges, and
  (4) having an inwardly extending thickened vertical lip adjacent each end,
    (a) the outer face of said lip extending inwardly at an angle of approximtely 45° relative to the plane of said wall, and
    (b) the inner face of said lip extending generally perpendicular to the plane of said wall,
(B) at least a pair of horizontal grooves in the outer faces of said lips at both ends of the wall member, said grooves of one wall member being disposed oppositely relative to the grooves of the next adjacent abutting wall member to define a passage for receiving a fastening element, (C) at least a pair of further horizontal grooves in the outer face of said end lip at one end of each of said wall members, (D) at least a pair of horizontal ribs on the outer face of said end lip at the other end of each of said wall members, said further grooves and ribs being so disposed that the further grooves of one wall member are engageable by the ribs of the next adjacent abutting wall member, and (E) clamping assembly means securing adjacent abutting wall members together, said clamping members comprising:
  (1) a first angular bracket disposed around the outer corner formed by adjacent wall surfaces and engaging said surfaces,
  (2) a second angular bracket disposed about the inner corner formed by the inner faces of the end lips of adjacent wall members and engaging said inner faces, and
  (3) a carriage bolt extending through said brackets and passage and having a nut thereon securing the brackets together.

9. A sectionalized box structure open on the top and bottom and comprising:
(A) a pair of parallel spaced apart vertical side walls and a pair of parallel spaced apart vertical end walls in miter-butt engagement therewith,
(B) inwardly extending horizontal flanges along the top and bottom edges of said wall members,
(C) an inwardly extending thickened vertical lip adjacent each end of said wall members,
  (1) the outer face of said lip extending inwardly at an angle of approximately 45° relative to the plane of said wall, and
  (2) the inner face of said lip extending generally perpendicular to the plane of said wall,
(D) at least one horizontal groove in the outer faces of said lips at both ends of the wall member,
  (1) said groove of one wall member being disposed oppositely relative to the groove of the next adjacent abutting wall member to define a passage for receiving a fastening element, and
(E) clamping assembly means securing adjacent abutting wall members together, said clamping members comprising:
  (1) a first angular bracket disposed around the outer corner formed by adjacent wall members and engaging said members, and a second angular bracket disposed about the inner corner formed by the wall members and engaging inner surfaces of said members, the arms of said brackets being disposed at an acute angle less than the angle of the corner engaged by the bracket, whereby the corner surface is resiliently engaged by the ends of the arms, and
  (2) a fastening element extending through said brackets and passage securing the brackets together.

* * * * *